(12) United States Patent
Koskelainen

(10) Patent No.: US 7,149,522 B2
(45) Date of Patent: *Dec. 12, 2006

(54) SERVICE MOBILITY AND RECOVERY IN COMMUNICATION NETWORKS

(75) Inventor: Petri Koskelainen, New York, NY (US)

(73) Assignee: Nokia Corporation (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/005,672

(22) Filed: Dec. 7, 2004

(65) Prior Publication Data

US 2005/0111441 A1    May 26, 2005

(51) Int. Cl.
*H04Q 7/20* (2006.01)

(52) U.S. Cl. .............. 455/435.1; 455/411; 455/88; 455/417; 455/418; 455/550.1; 455/557; 379/355.03; 379/211.01; 379/211.02; 379/142.12

(58) Field of Classification Search ........ 455/435, 455/88, 411, 417–419, 420, 550.1, 551, 557; 379/355.03, 357.01, 142.7, 142.12, 211.02, 379/211.05

See application file for complete search history.

(56) References Cited

U.S. PATENT DOCUMENTS

| | | | | |
|---|---|---|---|---|
| 4,811,377 A | * | 3/1989 | Krolopp et al. | 455/550.1 |
| 5,029,233 A | * | 7/1991 | Metroka | 455/552.1 |
| 5,062,132 A | * | 10/1991 | Yasuda et al. | 455/557 |
| 5,168,517 A | * | 12/1992 | Waldman | 379/67.1 |
| 5,222,123 A | * | 6/1993 | Brown et al. | 455/417 |
| 5,259,018 A | * | 11/1993 | Grimmett et al. | 455/551 |
| 5,313,653 A | | 5/1994 | Sasuta | 455/17 |
| 5,524,276 A | * | 6/1996 | Littig et al. | 455/418 |
| 5,600,704 A | * | 2/1997 | Ahlberg et al. | 455/445 |
| 6,041,229 A | * | 3/2000 | Turner | 455/420 |
| 6,643,504 B1 | * | 11/2003 | Chow et al. | 455/411 |
| 6,912,384 B1 | * | 6/2005 | Huomo et al. | 455/417 |
| 2002/0147000 A1 | | 10/2002 | Holmes-Kinsella | 455/405 |
| 2003/0073440 A1 | | 4/2003 | Mukherjee et al. | 455/435 |

OTHER PUBLICATIONS

Adam Roach, SIP-Specific Notification, Jul. 2001, Sections 2, 2.1, 5.1.5.1, 5.2.2, 5.2.3.
Steve Donovan, IMPS-Instant Messaging and Presence Using SIP. Fall VON Developers+ Conference, Sep. 13, 2000.
Jonathan Rosenberg, SIP and Instant Messaging, SIP Summit 2001. May 1, 2001.

* cited by examiner

*Primary Examiner*—Steven M. D'Agosta
(74) *Attorney, Agent, or Firm*—Robert M. Bauer; Lackenbach Siegel, LLP

(57) ABSTRACT

A method improves mobility and service recovery for a user in a wireless communication network. Service information concerning the user is stored in a registrar. A subscription message is sent from a user terminal to the registrar. A header in the subscription message contains a unique indication. In response to the subscription message containing a unique indication in a header, the registrar returns a notification message to the user terminal. The payload of the notification message includes service information for the user to be used by the user terminal for communication services.

32 Claims, 9 Drawing Sheets

SERVICE MOBILITY AND RECOVERY IN COMMUNICATION NETWORKS

BACKGROUND

1. Field of the Invention

The present invention relates generally to the field of communications. In particular, the invention relates to the mobility and recovery of communication services for user terminals in a wireless communication network.

2. Discussion of the Related Art

A wireless communication network is typically comprised of several major portions: a plurality of mobile terminals (such as cellular phones), subscriber information, a radio access network, a switching system and network intelligence (primarily databases). Each mobile terminal contains an electronic card identifying the user, such as a subscriber identity module (SIM) in Global System for Mobile Communications (GSM) networks, or has some other arrangement permitting the user to communicate over the radio access network. The network contains a variety of elements and databases that contain customer information to check authorization for various communication services (e.g., voice, messaging, data and image services) and to process features in accordance with the communication services. The switching system connects mobile terminals to other mobile terminals in the same network or to elements in other networks such as the Internet.

Third-generation (3G) wireless communication networks support advanced mobile terminals and allow a user to subscribe to and access a large number of different communication services. An advanced mobile terminal supported by such a network and using the latest innovations in computers, software, displays and other technologies may access and receive many different advanced multimedia services in addition to conventional voice-based telephony services. These services may be provided by different information sources in other networks and may be based on and built upon Internet applications (e.g., Internet web browsing, video streaming, instant messaging, etc.). The services may include both pull services in which the specific transfer of information is initiated by the mobile terminal (i.e., web browsing, etc.) and push services in which the specific transfer of information is initiated by a network element (instant messaging, sports scores, news updates, etc.).

Technical Specification TS 23.228 V5.0.0 of the 3rd Generation Partnership Project (3GPP), discloses a 3G wireless communication network including an Internet Protocol Multimedia Core Network Subsystem (IMS) able to support multimedia communication services and is hereby incorporated by reference in its entirety as an example network environment. FIG. 1 depicts a general overall view of the main elements providing communication services in an IMS 100. (This depiction shows the functional architecture rather than a physical implementation.) The Home Subscriber Server (HSS) 102 contains user related information such as user identification (UserID), numbering, address information, and a user profile including, for example, subscription information, services and service specific information. The Serving Call Session Control Function (S-CSCF) 101 provides call control, session control and service control for mobile terminals. When a mobile terminal is visiting a network other than its home network, the visited network preferably utilizes a Proxy Call Session Control Function (P-CSCF) that enables the session control to be passed to the home network based S-CSCF providing service control for the mobile terminal. The communication services may be provided by an Application Server 103 within IMS 100 and connected directly to S-CSCF 101 or by an application server in another network or on the Internet, such as an Open Services Architecture (OSA) Application Server 105 connected to S-CSCF 101 indirectly through an OSA application programming interface (API) to OSA Service Capability Server (SCS) 104.

Other than the Cx interface to HSS 102, S-CSCF 101 utilizes the Session Initiation Protocol (SIP) developed by the Internet Engineering Task Force (IETF) or an extension or backward compatible revision thereof for all connections to other network elements. Unlike HyperText Transfer Protocol (HTTP), SIP supports an advantageous event notification scheme. In SIP event notification, the client, such as a mobile terminal, sends a SUBSCRIBE message to a remote element, such as a server, indicating that it wants to receive a notification from the remote element when a specific event has occurred. The SUBSCRIBE message includes To, From and Call-ID headers and an event header to indicate the specific event. Typically, the provider of a communication service designates the event name (i.e., "soccer") for its service When the specific event occurs, a NOTIFY message is sent to the client. The NOTIFY message copies the To, From and Call-ID headers from the SUBSCRIBE message and the content format is event specific and defined separately for each event. For example, in a presence case like instant messaging in which the specific event is when a specified person logs into the network, the content format is extensible Markup Language (XML) format. SIP is advantageous in wireless communication networks because the event notification scheme can utilize a SIP proxy network and SIP registrars. In such cases, a client subscribes to events using its SIP Uniform Resource Locater (URL) maintained by the SIP registrar instead of the direct contact address (e.g. numeric terminal IP address). The requirement that the NOTIFY message must copy the To, From and Call-ID headers from the SUBSCRIBE message provides reasonable protection against spammers and other unwanted notifications. The client can be set to accept only those NOTIFY messages which have the correct To, From and Call-ID headers.

However, SIP was developed with data-centric networks in mind rather than voice-centric wireless communications networks where value added services are mostly based on supplementary service and Intelligent Network (IN) architectures. The service framework in voice-centric wireless communication networks is quite static and it is quite difficult to add new advanced features. There are problems and disadvantages to implementing SIP in the supporting network and services for a wireless communication network such as IMS 100 shown in FIG. 1. For example, as mentioned in Part 5.1.5 of TS 23.228, HSS 102 of IMS 100 stores all of the subscription information necessary for user terminals and informs S-CSCF 101 whenever the subscription information changes for a user. Conventionally, the subscription information in HSS 102 is used by S-CSCF 101 whenever the user visits another access network or uses a different terminal. However, in some circumstances, such as the SIP event notification scheme described above, certain information generated by the mobile terminal (e.g., To, From and Call-ID header information and Event name from SUBSCRIBE messages) must be maintained in the user terminal rather than in the server(s) providing the subscription service or some other network element. If this information is not available to a user terminal, then the user terminal cannot filter incoming NOTIFY messages and prevent against spamming, etc. In addition to knowledge about ongoing communication services, there may also be other information, such as numerous parameters and/or settings, needed by the user terminal to receive those communication services. The parameters and/or settings may include for instance communication networks parameters, such as General Packet Radio Service (GPRS) parameters or Universal Mobile Telecommunication System (UMTS) parameters, Wireless Application Protocol (WAP) parameters comprising a WAP Gateway address a Uniform Resource Locator (URL) for setup, a home page and favorites, World Wide Web (WWW) parameters comprising a Hyper Text Transfer Protocol (HTTP) proxy address, SMTP/POP3 addresses, public keys, Ipv4, Ipv6, and a Default Classmark for multiclassmark devices. There may also be general information, such as network subscription and authorization information or calling plan information or lists of telephone numbers, stored in the user terminal and which is desired to be available to the user to enable or facilitate communications.

There may be a problem if the user's terminal malfunctions for any period of time (i.e., the terminal crashes and information is lost before it is stored in a memory device) or the terminal has a failure which causes it to lose any information (i.e., memory failure, loss of backup power, etc). There is thus a need for a solution that allows the user terminal to quickly recover in the case of a crash, etc. Furthermore, if a user switches to a different terminal, the new user terminal will not be able to access the stored information in the previous terminal and thus cannot easily continue to receive the subscription services. A user may switch terminals for any reason. For example, they may need or prefer to user different terminals to receive different subscription services, possibly having different quality of service (QoS) requirements, on different respective mobile terminals that are better suited to receiving certain types of services. For example, a user may prefer to use a cellular phone for receiving phone calls and short alphanumeric text messages and to use a laptop computer, with a wireless connection, to receive streaming video. A user may also need or prefer to use different terminals, for example, when receiving services through different access networks such as, for example, wireless local area networks (WLAN), Bluetooth networks or 3G WCDMA radio networks. A user may also simply want to exchange an older mobile terminal in favor of a newer model. In any event, there is a need to allow a user of a new terminal to easily obtain the information stored in a previous terminal when switching to the new terminal.

Although a user could contact a particular service to inform that service of the user's new terminal, that is inconvenient. Furthermore, there would still be a problem in any event if the user subscribes to many communication services and/or different types of communication services. There is thus a need for a solution that allows the information to be available if a user switches between different terminals. It is possible to have the user install the necessary service information when switching to a new terminal to be used. However, manual input is a poor solution because data input on a mobile terminal can be difficult, prone to human errors, and time-consuming. Even if an automatic system solution is used, when there are a large number or different types of communication services, the amount and types of information, parameters, and/or settings may require several automatic systems and it can be quite time consuming to download over a wireless communication network.

For at least these reasons, there is inadequate mobility and recovery of user services when a user switches between different mobile terminals, such as a cellular telephone, a personal digital assistant (PDA), etc., in a wireless communication network utilizing SIP and supporting may different types of communications services. Accordingly, there is a need for providing an effective solution for mobility and service recovery to a user switching between different terminals in a wireless communication network utilizing SIP and supporting may different types of communications services.

BRIEF SUMMARY

It is therefore an object of the following described example embodiments to overcome the above mentioned disadvantages. In particular, the example embodiments provide a solution which facilitates mobility and service recovery when there is a failure in a user's terminal or when the user switches between different terminals in a wireless communication network supporting many different types of communications services.

In the example embodiments, the information necessary for providing mobility and service recovery for users' communication services is maintained in a server rather than in the users' terminals. A user terminal communicates with the server as desired to manage the communication services such as by requesting that the information be provided to the user terminal.

A particular aspect of the example embodiments involves an extension to SIP event notifications that allows fast service recovery (e.g., if a terminal fails) and mobility between different terminals by requesting that communication services be restored by a SIP registrar. The terminal initiates the process by sending a specially designated SIP event notification message to the SIP registrar. The SIP registrar re-registers the user with all of their ongoing communication services and includes information of all of the user's ongoing communication services in the payload of a message sent to the user terminal so that the user terminal may continue those communication services and manage them. The message sent to the user terminal may also include additional information useful or necessary for communication services other than SIP communication services.

A particularly useful application of the example embodiments is for push services in which a specific transfer of information to the user terminal is not initiated by the user terminal. The user terminal exchanges messages with a push proxy which manages the push services provided to the user terminal using status information for the terminal obtained from a presence server with which the user terminal is registered. According to the example embodiments, the push proxy re-registers the user terminal with push service providers or initiators after the terminal experiences a failure or the user switches terminals and provides information to the new or recovered user terminal so that the new or recovered user terminal can continue to receive the push services.

BRIEF DESCRIPTION OF THE DRAWINGS

A more complete appreciation of the example embodiments, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION

The example embodiments are applicable for use with all types of cellular networks and local ratio networks, including wireless local area networks (WLAN), and interconnected systems using SIP for voice, message, data and image transfers between systems in such networks. For example, $3^{rd}$ generation GSM networks include data networks using General Packet Radio Service (GPRS) technology for mobile data networking services and personal multimedia services, and Enhanced Data Rates for Global Evolution (EDGE) technology for high bit rate data services. GPRS technology is used in GSM networks to enable users to connect at higher data rates and facilitate applications such as wireless email and web-browsing. EDGE boosts data speeds and allows video and mobile multimedia applications with data rates as high as 473 kbps. BlueTooth networks and/or Wideband CDMA (WCDMA) networks may be used in place of the wireless local area networks (WLAN). However, for the sake of simplicity, discussions will concentrate mainly on mobility and service recovery in a 3G cellular network such as that described in 3GPP TS 23.228 V5.0.0.

The example embodiments use a new, specially designated subscribe message in the SIP event notification scheme to have information made available to a user's terminal. However, the principles and features of the example embodiments are not restricted in their application to SIP, and can be applied to any messaging protocol providing for subscription messages and notification messages. Attention now is directed to the drawings and particularly to FIG. 2, which shows the flow diagram for a mobility and service recovery method according to the example embodiments, keeping in mind that the example embodiments may be carried out in a variety of different networks.

In general, a user terminal must provide some identification to a network in order to gain access and receive communication services. The identification may be anything that uniquely identifies the user, such as a SIM card or telephone number. Once authorized and granted access to the network, the user may arrange for a plurality of different communication services. Each individual one of these communications services may be provided by an application server located in the wireless communication network or an applications server located in other networks or on the Internet and delivered through the wireless communication network. The communication services available to the user terminal include at least some SIP services that utilize the SIP event notification scheme. The network contains a SIP registrar for the SIP services. A SIP registrar is any network element that provides the functionality described herein. It may be any one of the application servers, a proxy server for the user terminal, or HSS 102 in IMS 100. It stores address bindings and contains information for the SIP services for users on the network in a database.

Figure 1:
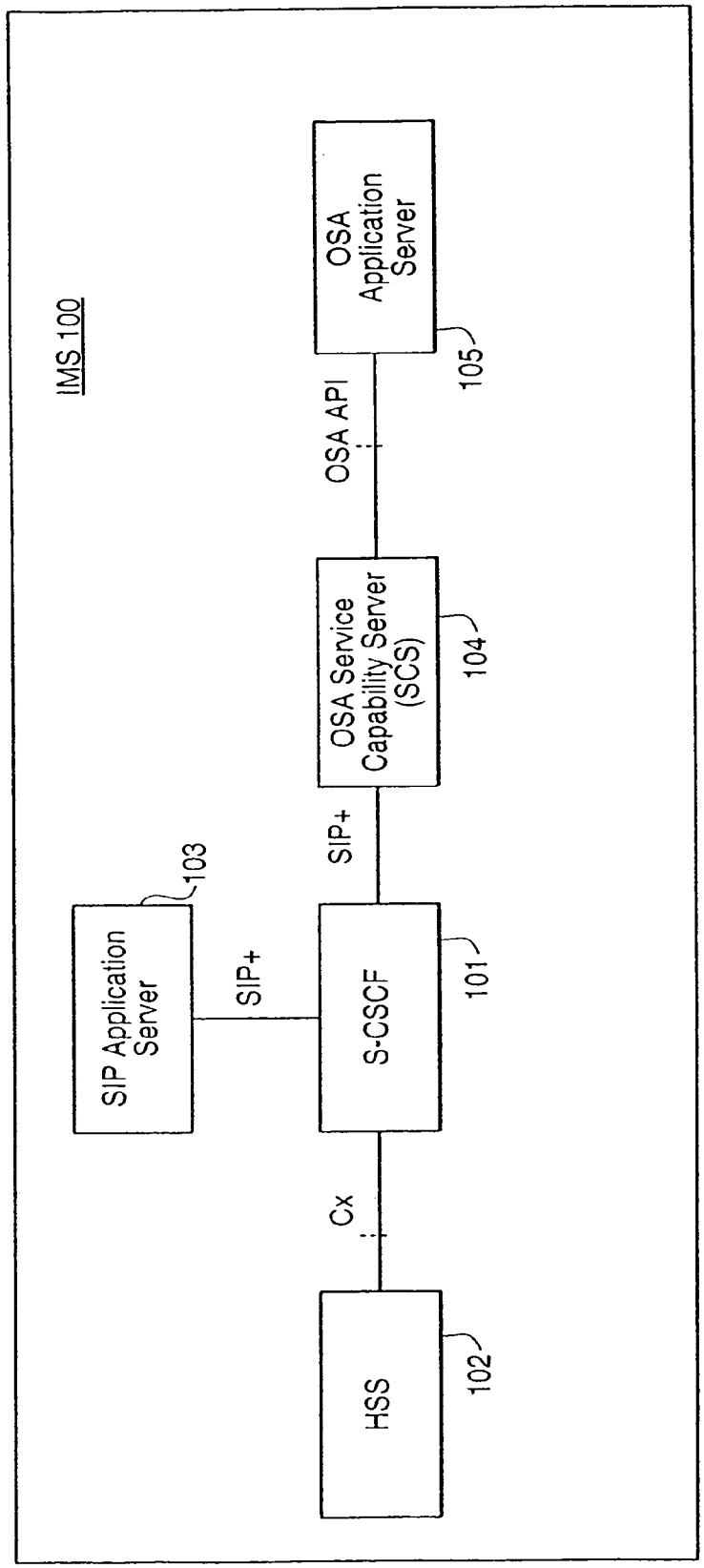
FIG. 1 illustrates the functional architecture of an exemplary IP Multimedia subsystem of a 3G wireless communication network in which the example embodiments may be carried out.
Figure 2:
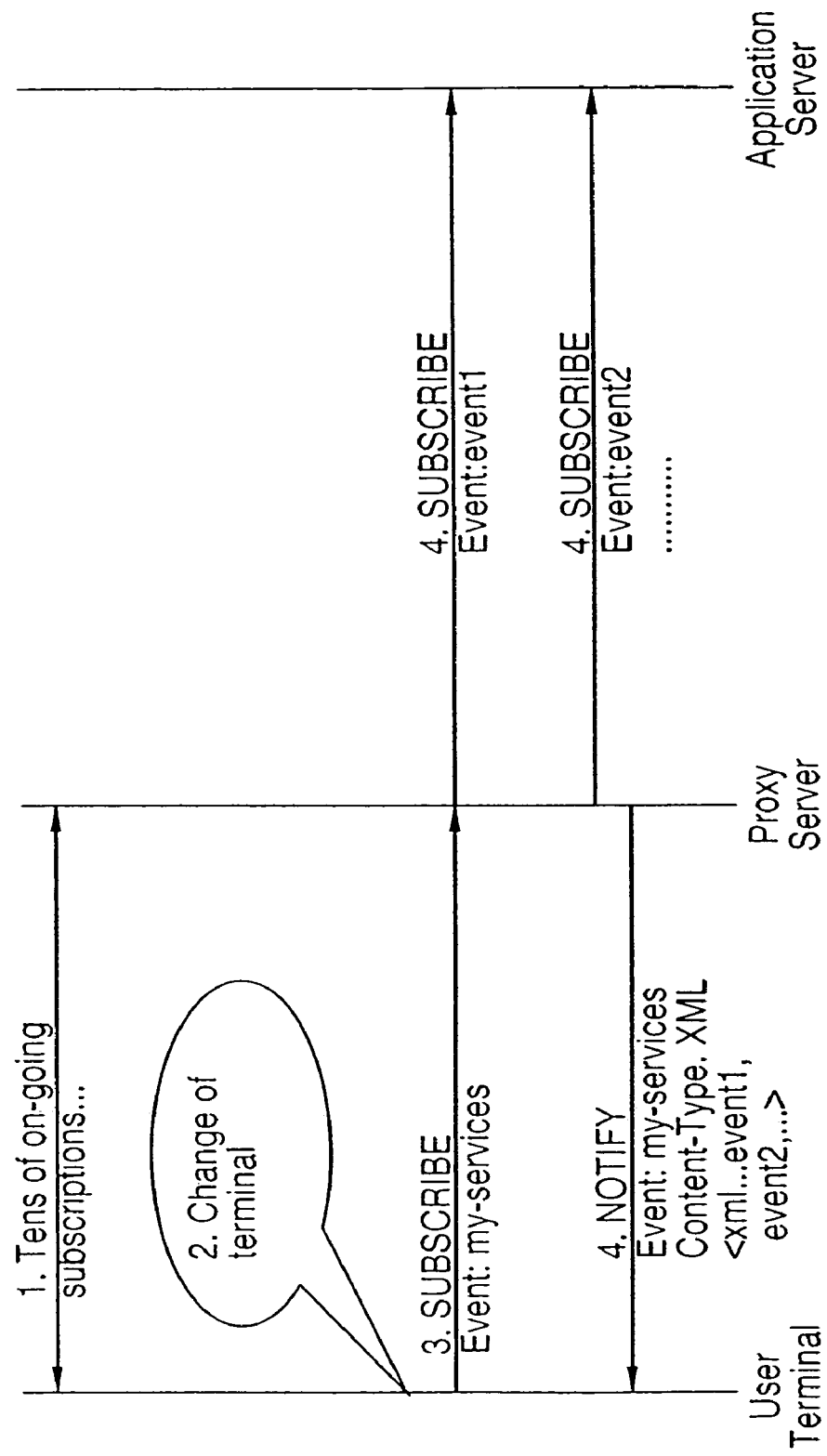
FIG. 2 is a flow diagram illustrating the steps performed in a service mobility and recovery method according to the example embodiments.

As represented by step 201 in FIG. 2, a user of a mobile terminal is receiving a plurality of ongoing communication services. At step 202, the user changes mobile terminals so as to change from a previous mobile terminal to a new mobile terminal. The change of terminal may be for any reason. At step 203, the new mobile terminal sends a SIP SUBSCRIBE message to the SIP registrar according to the SIP event notification scheme. The message is directed through the network and routed to the SIP registrar. The event described by the SIP SUBSCRIBE message is a special event called, for example, "my services", but the message has a format and syntax which is otherwise the same as conventional SIP SUBSCRIBE messages. The user may be identified simultaneously with, or separate from, the SIP subscribe message. The identification information may be provided by the user terminal or by a network element which authenticates the user. In response to the SIP SUBSCRIBE message including the "my services" event and suitable identification of the user (which may be provided simultaneously with, or separate from, the SIP SUBSCRIBE message), the SIP registrar obtains the information for all of the user's ongoing communications services from the database. The database has a variety of information for users' ongoing communication services, preferably indexed or sortable by user identification. When the user is identified and the information is returned from the database, the SIP registrar sends a SIP SUBSCRIBE message for each one of the ongoing communication services to the corresponding application server for that service. The SIP registrar also sends a response 204-r to the SIP SUBSCRIBE message including the "my services" event to the new user terminal. The payload response includes information necessary for the communication services to be received by the new user terminal. The new terminal then examines the payload and determines therefore the data necessary to continue the communication services. Optionally, the payload may also include related parameters and/or settings necessary to receive the services. The needed parameters and/or settings may include communication network related parameters such as GPRS parameters or UMTS parameters, WAP parameters comprising a WAP Gateway address, a Uniform Resource Locator (URL) for setup, a home page and favorites, WWW parameters comprising an HTTP proxy address, SMTP/POP3 addresses, public keys, Ipv4, Ipv6, and a Default Classmark for multi-classmark devices, software updates, applets, network storage location, a user preference list, firmware updates, etc. There may also be general information, such as network subscription and authorization information or calling plan information or lists of telephone numbers, stored in the user terminal and which is desired to be available to the user to enable or facilitate communications.

Figure 3:
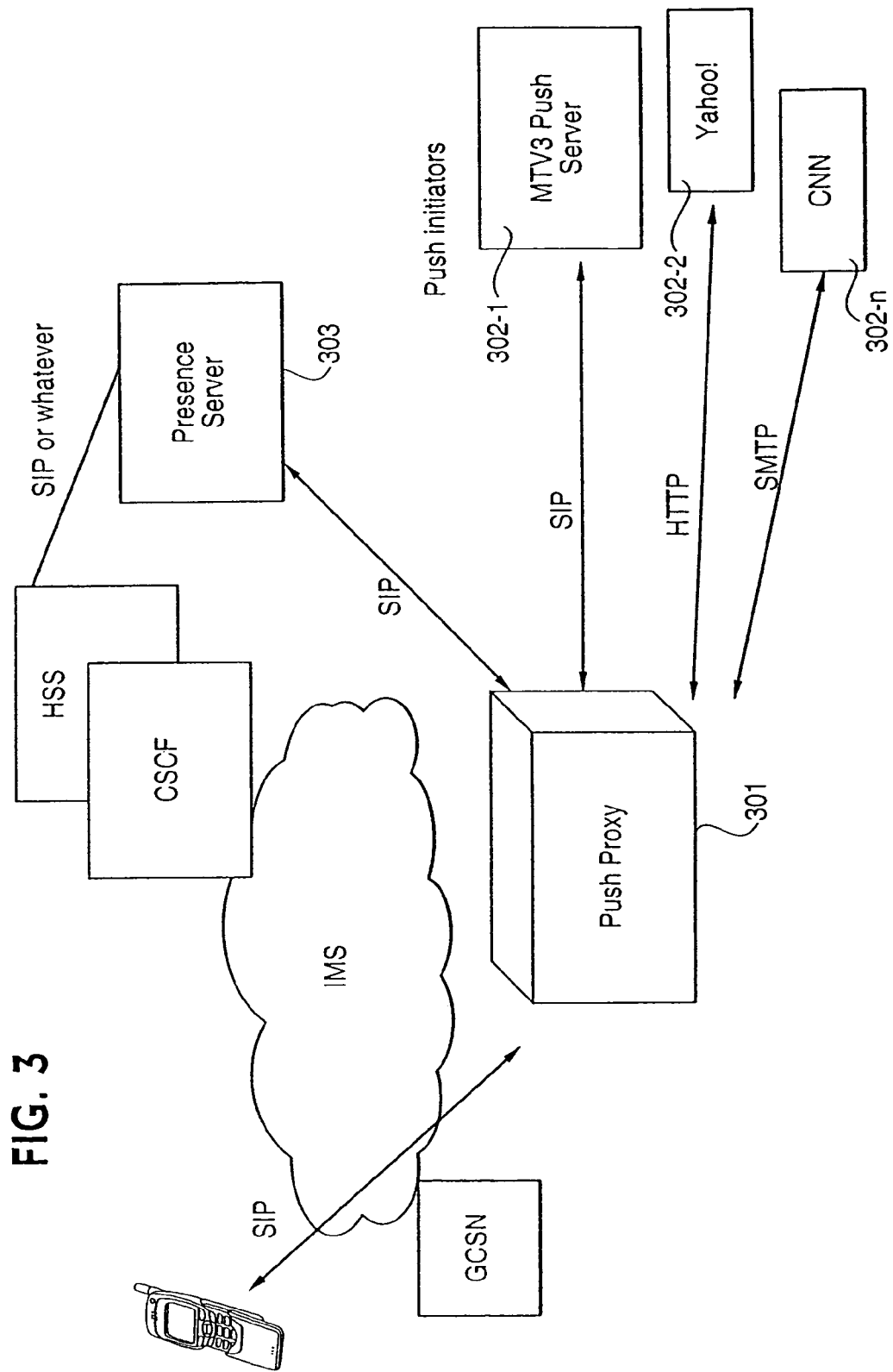
FIG. 3 illustrates the functional architecture of an exemplary network supporting SIP push communication services.

The method described with respect to FIG. 2 may be advantageously applied when SIP is used to provide push services. Conventionally, push services are different than SIP event notifications since, in push, the client does not initiate the transfer of information whereas a SIP event notification is initiated by a client sending a SIP SUBSCRIBE message. An example of a functional architecture for push services to a user terminal is shown in FIG. 3. A push proxy 301 maintains the push services (e.g., user subscriptions, receiving push information from push initiators originating the push information, and sending notifications to users) and acts as a gateway between the user terminal and a plurality of different push initiators 302-1 to 302-n (which may use respectively different push protocols) which forwards/converts push messages to/from a client. A push initiator 302-1 to 302-n may provide push information to push service providers (not shown) using either SIP or another protocol. The push service provider (e.g., internet service provider or content provider) provides information (which may be based, for example, on personal user profiles) and manages push proxy 301 for a user terminal, although the network operator may also provide notifications and advertisements. Instead of using a push service provider, a push initiator 302-1 to 302-n may be co-located in the push proxy or be combined with the push proxy itself.

A user terminal is registered as a client with presence server 303 through HSS 102 associated with IMS 100. Presence server manages information indicating the presence, location and/or status of the user terminal. Push proxy 301 is subscribed to presence server 303 and utilizes the information corresponding to the user as described below. When a user terminal changes its location, it re-registers to its presence server 303 to update its location (and other information). SIP is preferably used for these registrations. Push proxy 301 is notified about the changes in the user status. The push services use the address of push proxy 301 (e.g., user@domain.com) instead of real IP addresses in order to facilitate mobility of the user terminal. The protocol between push proxy 301 and the user terminal and presence server 303 is SIP. The protocol between push proxy 301 and the push initiators 302-1 to 302-n can be SIP or some other protocol, such as HTTP or SMTP as shown in FIG. 3.

Figure 5:
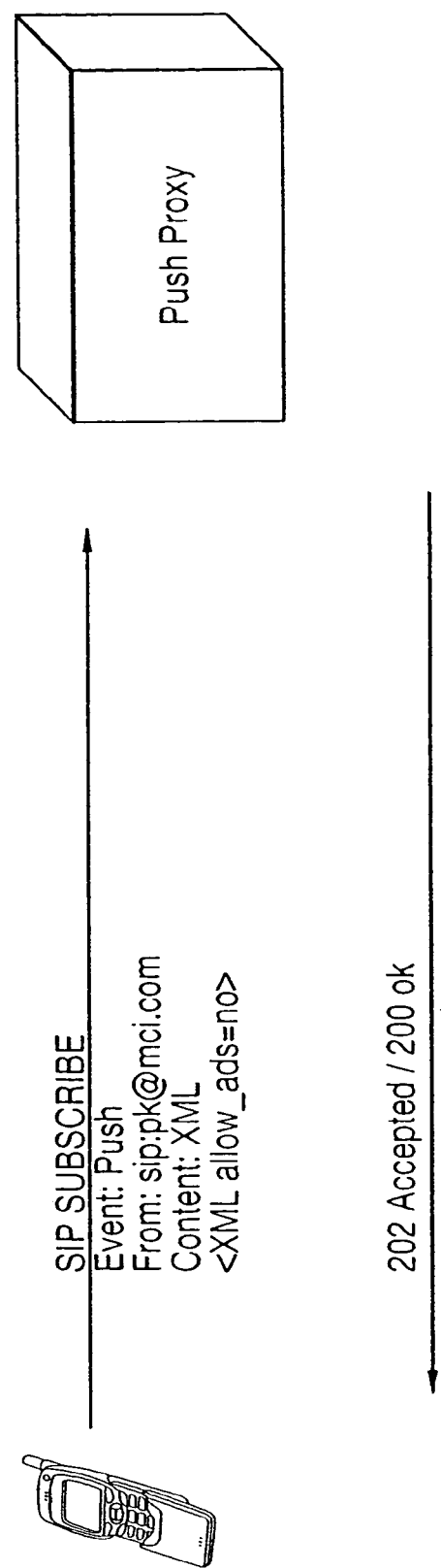
FIG. 5 illustrates an example of a message sent by a user terminal to obtain a push service through a push proxy using SIP event notification.
Figure 6:
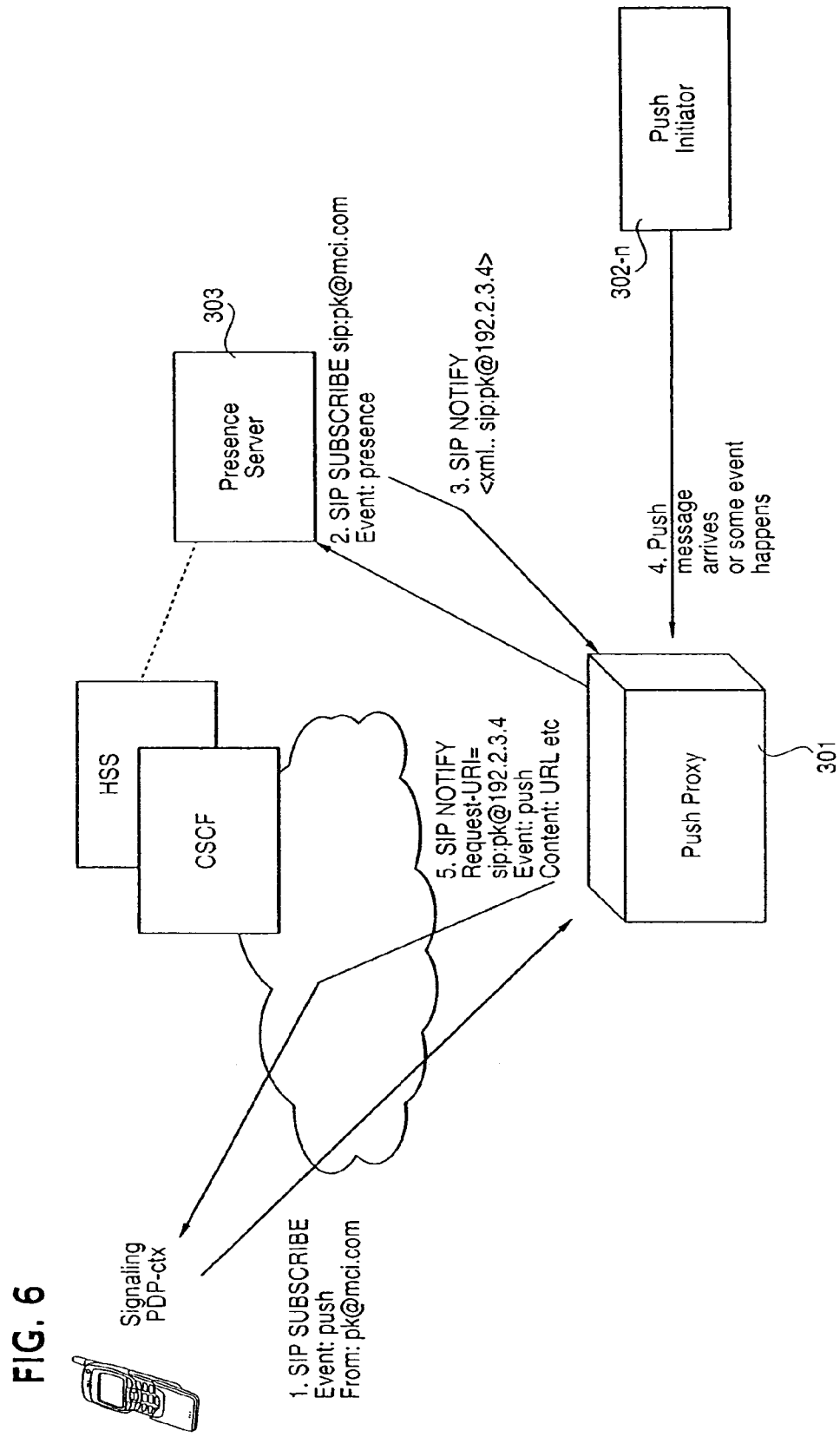
FIG. 6 illustrates a sequence of messages to provide for a push service through a push proxy when a user terminal sends a message to obtain a push service using SIP event notification.
Figure 8:
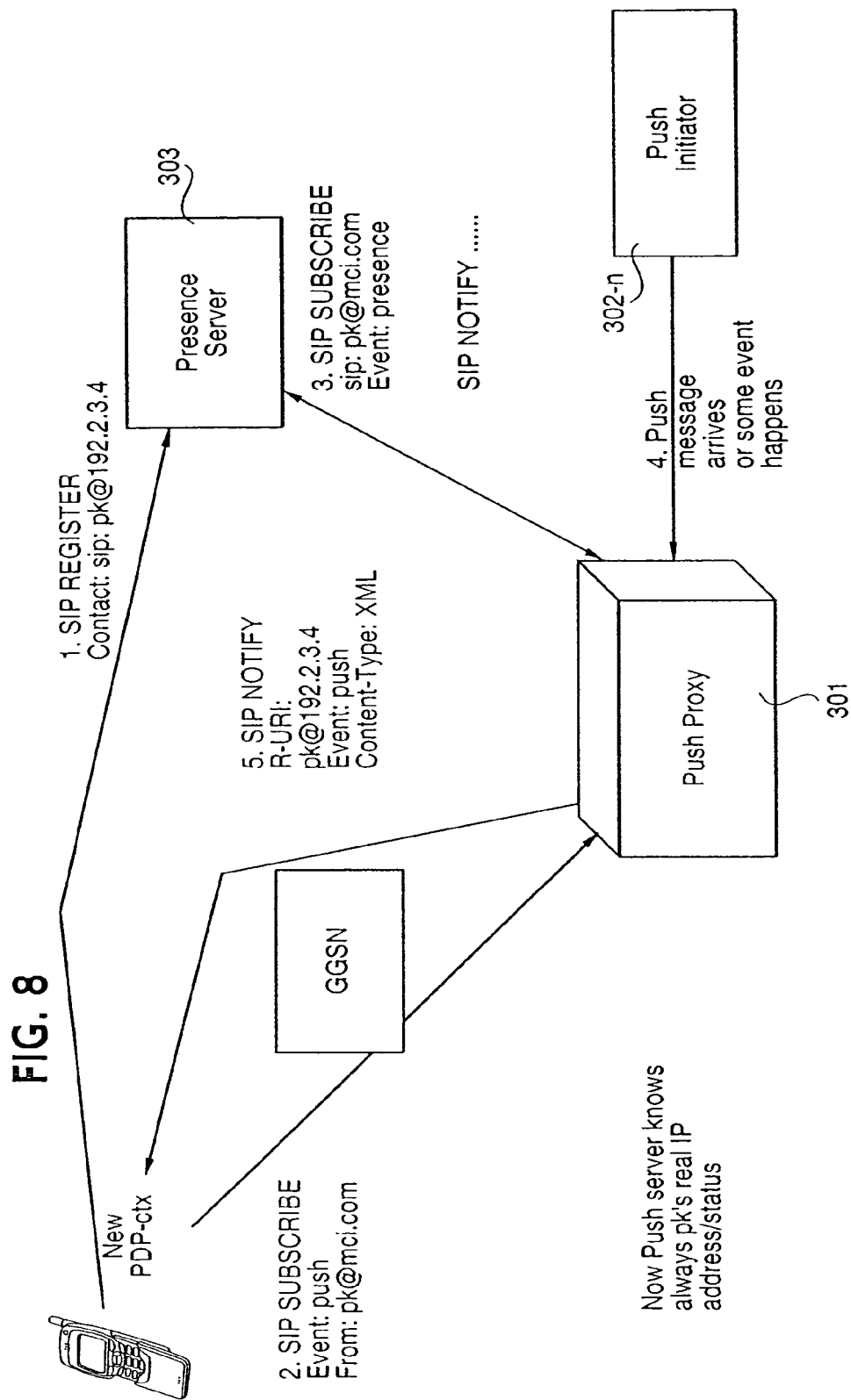
FIG. 8 illustrates a sequence of messages providing for a push service to a user terminal after the user terminal registers with a presence server.

When a user subscribes to a push service, it does so through push proxy 301 using the SIP SUBSCRIBE message or an out-of-band mechanism (e.g., world wide web). The event identified in the SIP SUBSCRIBE message is "Push" and the payload in the SIP SUBSCRIBE message may contain optional XML content defining the user's preferences/policies (e.g., personal interests, terminal capabilities, bandwidth restrictions/preferences, etc.). As an example, FIG. 5 shows a SIP SUBSCRIBE message indicating that the user receives no advertisements and the acknowledgement returned by the push proxy. (In an alternative out-of-band subscription, the user terminal must retain the subscription information (To, From, Call-ID headers) in order to do the notification filtering.) Once push proxy 301 receives the message from the user terminal (step 1 in FIG. 6), it then subscribes to presence server 303 (step 2 in FIG. 6) and receives a response including information indicating the location/status of the user terminal (step 3 in FIG. 6). When the event designated in the SIP SUBSCRIBE message from the user terminal occurs (step 4), push proxy 301 forwards a SIP NOTIFY message to the user terminal (step 5) using the information obtained in step 3. Preferably, presence server 303 receives information of the user terminal as a matter of due course from core network elements CSCF 101 and HSS 102 of IMS 100. If however, as shown in FIG. 8, there is no IMS or these elements are not otherwise available to presence server 303, then the user terminal must directly register with presence server 303, preferably using SIP as shown in step 1 of FIG. 8. The remaining steps can then proceed in the same manner as in FIG. 6. Preferably, presence server 303 hides the fact of whether there is an IMS or not from push proxy 301.

Figure 7:
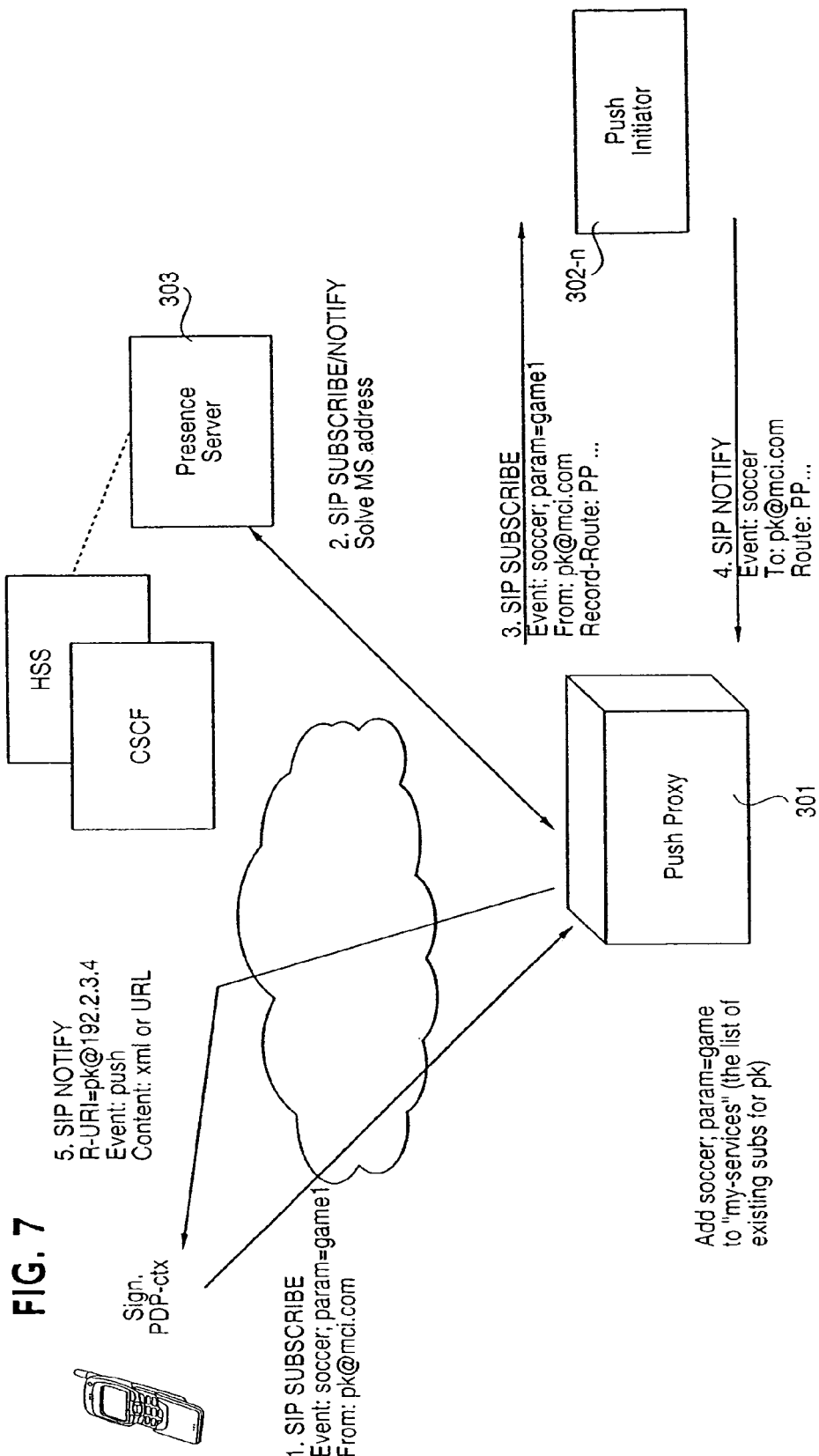
FIG. 7 illustrates a sequence of messages sent to provide for a communication service to a user terminal, and to register the communication service for the user in a push proxy, when the user terminal sends a message to obtain the communication service.

An example of a subscription to a push service according to the example embodiments of the invention is shown in FIG. 7. The SIP SUBSCRIBE message from the user terminal identifies an event ("soccer") and a parameter ("game 1") (step 1). After push proxy 301 subscribes to presence server 303 (step 2), it subscribes to push initiator 302-n (step 3) using the same event and parameter as in the user terminal's original SIP SUBSCRIBE message. (Push proxy 301 may give additional subscription information to a push service provider such as, for example, the bandwidth for push services, terminal capabilities and personal interests.) When push initiator 302-n responds (step 4), push proxy 301 adds the event and parameter to the list of existing subscription for the user ("my services") and forwards a SIP NOTIFY message to the user terminal (step 5).

While the user remains subscribed to the service, push proxy 301 delivers the push information from push initiator 302-n to the user's terminal using the terminal's current location information available to it from the presence server 303. If the user terminal is not available (e.g., it is out of range), push proxy 301 stores information (e.g., based on user preferences) and informs the user later. Push proxy 301 is also responsible for rate control (e.g., allowing a maximum rate of traffic to avoid momentary traffic peaks. If the user is subscribed to two push proxies, then the rate control must be more carefully adjusted (e.g., by advising both push proxies to allow a maximum of half of the total bandwidth capacity available for push services in the user terminal's access link).

Push information is always delivered to the user terminal using SIP NOTIFY and the same To, From and Call-ID headers in the service subscription. As shown in FIG. 3, push proxy 301 may utilize several push initiators 302-1 to 302-n and use different protocols (e.g., HTTP, email, SIP, RTP, non-IP protocols) for different push initiators. The payload in the SIP NOTIFY message depends on the push type and the user terminal's capabilities. For message type notifications (i.e., occasional events in sports matches), the SIP NOTIFY message may carry, for example, XML or ascii payload. For streaming type push information, the SIP NOTIFY payload includes the details of the streaming session. It may be, for example, a URL (e.g., RTSP URL) or SDP (to define a video call).

Figure 4:
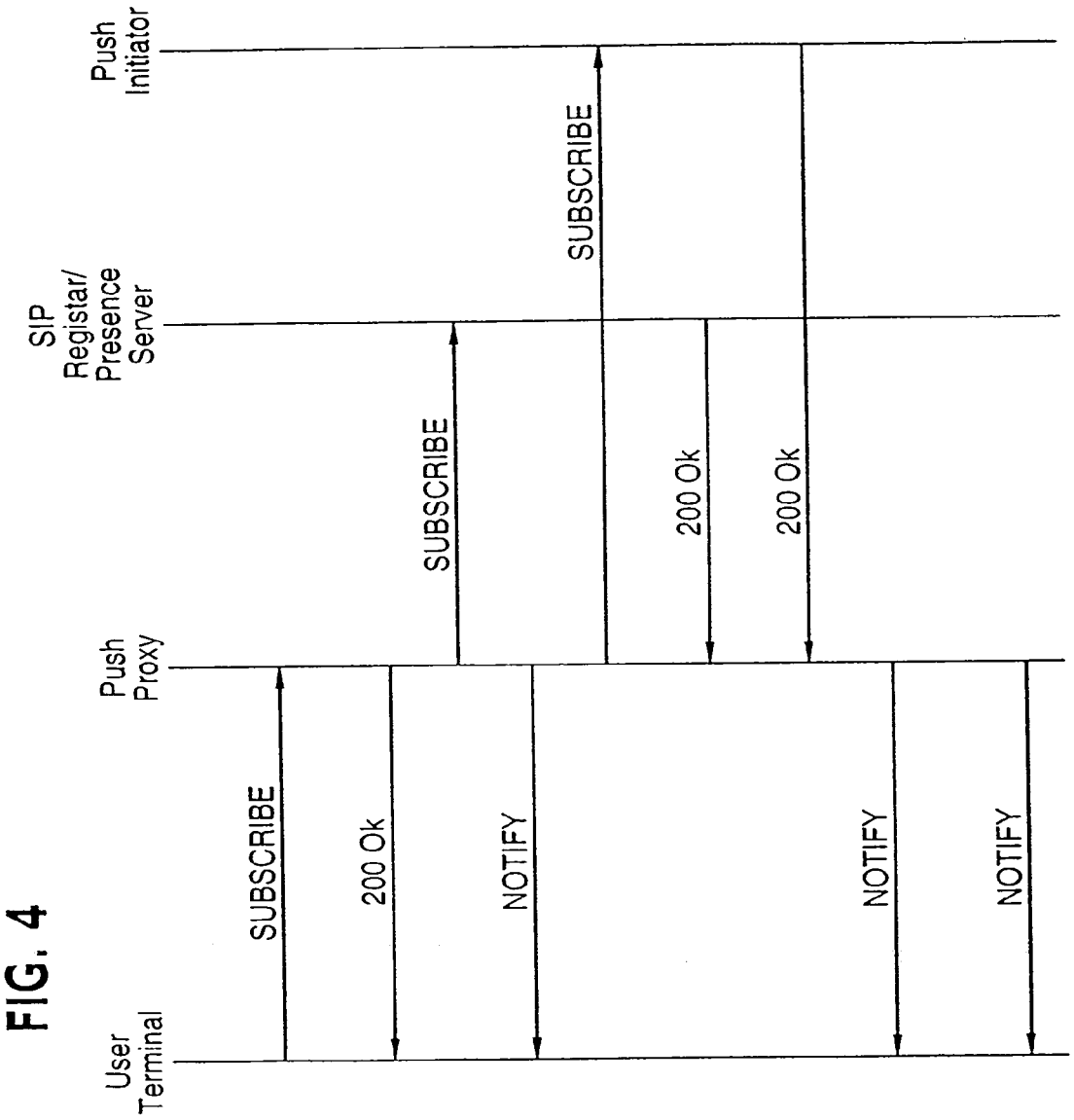
FIG. 4 is a flow diagram illustrating the steps performed in a SIP push communication service using the functional architecture shown in FIG. 3.

FIG. 4 is a flow diagram illustrating the steps performed in a SIP push communication service using the functional architecture shown in FIG. 3. At step 401, the user subscribes to the push service by sending a SIP SUBSCRIBE message such as the following to push proxy 301:
SUBSCRIBE sip:pushproxy.com SIP/2.0
To: sip:pushproxy.com
From: sip:user@isp.com
Call-ID: abc
Event: presence At step 402, push proxy 301 responds with a 200 Ok message. At step 403, push proxy 301 subscribes to the uac's SIP registrar/presence server 303 by sending a SIP SUBSCRIBE message such as the following to SIP registrar/presence server 303:
SUBSCRIBE sip:user@isp.com SIP/2.0
To: sip:user@isp.com From: sip:pushproxy.com
Call-ID: abc
Event: presence At step 404, push proxy 301 immediately sends a SIP NOTIFY such as the following to the user terminal:

NOTIFY sip:user@isp.com SIP/2.0

Then, at step 405, push proxy 301 subscribes to the push initiator 302-1 on behalf of the user (push proxy 301 may have already subscribed to push initiator 302-1 for other users) by sending a SIP SUBSCRIBE message such as the following:

SUBSCRIBE sip:pi.com SIP/2.0

Push proxy 301 then waits to receive a 200 Ok message from SIP registrar/presence server 303 in response to the SIP SUBSCRIBE message sent at step 403 and a 200 Ok message from push initiator 302-1 in response to the SIP SUBSCRIBE message sent at step 405 (steps 406 and 407). Upon receipt of the 200 Ok messages in steps 406 and 407, push proxy 301 provides the push information to the user. A message type push service may be provided by sending a SIP NOTIFY message such as the following to the user:

NOTIFY sip:user@isp.com SIP/2.0
EVENT: push
Content-Type: text/plain
Status of soccer match: A-B 2-2
Scores: Player Name (77 min.)

A streaming type push service may be provided by sending a SIP NOTIFY message such as the following to the user:

NOTIFY sip:user@isp.com SIP/2.0
Event: push
Content-Type: application/html
<html>Breaking news from CNN!
<a href=cnn.com/video1.ram>Live video feed from CNN</A><br>

Figure 9:
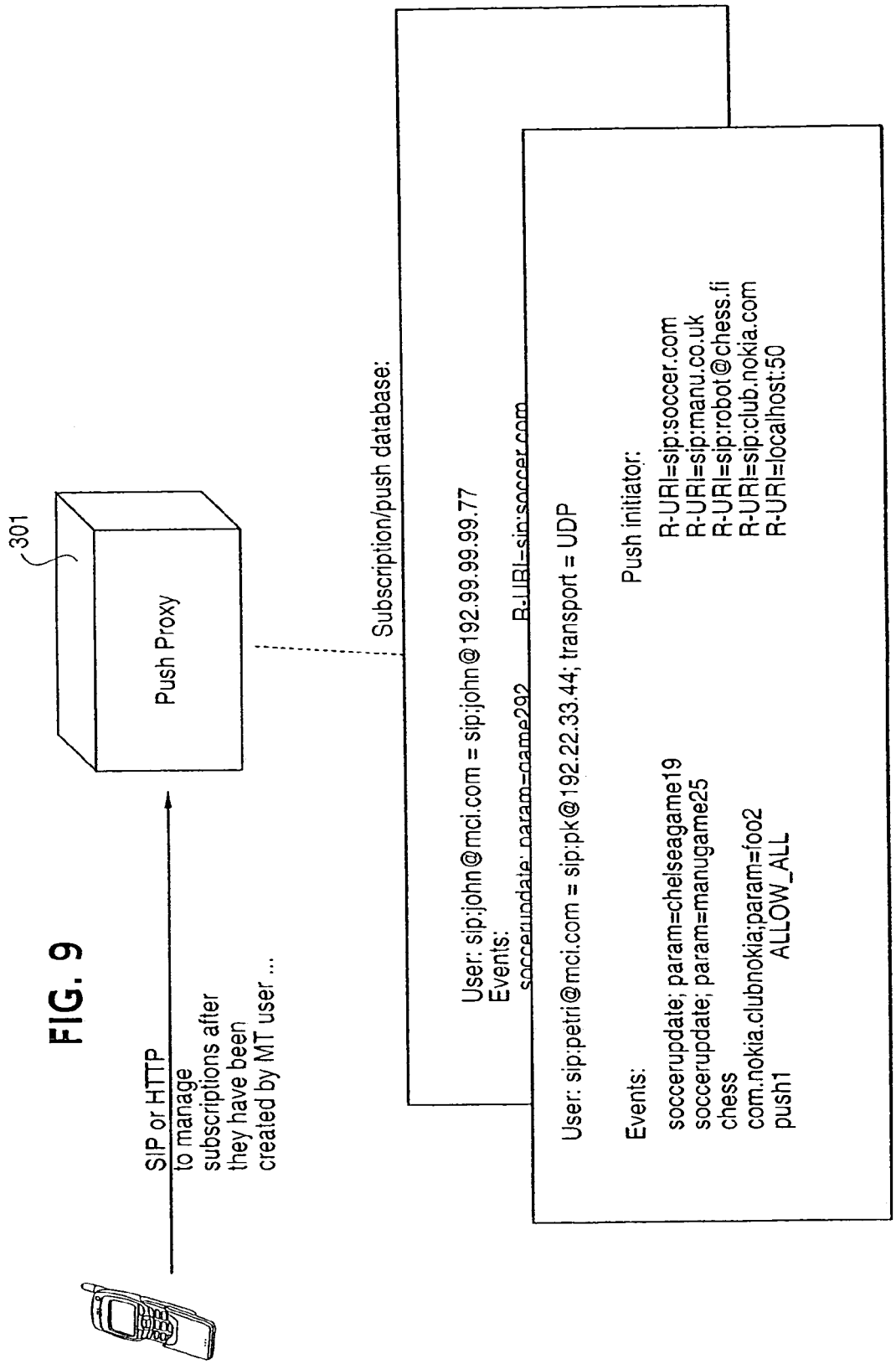
FIG. 9 illustrates a message sent by a user terminal to a push proxy to manage ongoing communication services.

The important aspect of the example embodiments is that the user terminal can easily access all of the service information relating to it stored in push proxy 301 using a simple reference to the "my-services" list. Preferably, the "my-services" list can be accessed and used by the user terminal to manage subscriptions after the subscriptions have been created. FIG. 9 shows examples of the "my-services" list in a database maintained by push proxy 301.

Of course, the main advantage is that the list may be accessed by a SIP SUBSCRIBE message in which the event name is "my-services". This allows mobility and service recovery for push services using the method illustrated in FIG. 2 and described above. It is particularly advantageous for push services which, from the perspective of the user, are intended to be delivered to the user without any request being made therefore.

Of course, in a particular implementation, there is likely to be a combination of push services and other services. However, as just described, the same method can be used for mobility and recovery of both push services and other communication services when there is a terminal failure or the user switches terminals as described previously. As can be seen from the foregoing, using a special SIP SUBSCRIBE message for mobility and service recovery yields a fast and efficient solution which is easy to implement when there is a terminal failure or a change of terminals. While the invention has been described with reference to example embodiments, the description is illustrative and is not to be construed as limiting the invention. In particular, the various references to subscriptions refers merely to the terminology used in association with SIP and is not meant to imply that the communication services must necessarily be provided in exchange for monetary compensation.

The invention claimed is:

1. A method of mobility and service recovery for a user in a wireless communication network, said method comprising:

storing service information concerning the user in a registrar, said service information being information which allows the user to continue their ongoing communication services at a new or recovered user terminal;

sending a subscription message from the new or recovered user terminal to the registrar, a header in the subscription message containing a unique indication of a particular user; and in response to said subscription message containing a unique indication in a header, returning a notification message to the new or recovered user terminal, the payload of said notification message including said service information which allows the user to continue at least some of their ongoing communication services at the new or recovered user terminal.

2. The method as claimed in claim 1, wherein the user has a plurality of ongoing communication services at the time that the subscription message containing a unique indication in a header is sent.

3. The method as claimed in claim 2, wherein the payload of said notification message includes service information for each one of said ongoing communication services.

4. The method as claimed in claim 1, wherein said new or recovered user terminal comprises a recovered user terminal and said subscription message is sent after said recovered user terminal experiences a failure.

5. The method as claimed in claim 1, wherein said new or recovered user terminal comprises a new user terminal and said subscription message is sent by said new user terminal after said user switches terminals from a previous user terminal to said new user terminal.

6. The method as claimed in claim 5, wherein said new user terminal is a different type of user terminal than said previous user terminal.

7. The method as claimed in claim 1, wherein said communication services include a push service and the registrar is a push proxy.

8. The method as claimed in claim 1, wherein said registrar comprises a SIP registrar, said subscription message comprises a SIP SUBSCRIBE message, said header comprises an event header, and said notification message comprises a SIP NOTIFY response.

9. The method as claimed in claim 8, wherein the user has a plurality of ongoing communication services at the time that the SIP SUBSCRIBE message containing a unique indication in the event header is sent.

10. The method as claimed in claim 9, wherein the payload of said SIP NOTIFY response includes service information for each one of said ongoing communication services.

11. The method as claimed in claim 8, wherein said new or recovered user terminal comprises a recovered user terminal and said SIP SUBSCRIBE message is sent after said recovered user terminal experiences a failure.

12. The method as claimed in claim 8, wherein said new or recovered user terminal comprises a new user terminal and said SIP SUBSCRIBE message is sent by said new user terminal after user switches terminals from a previous user terminal to said new user terminal.

13. The method as claimed in claim 12, wherein said new user terminal is a different type of user terminal than said previous user terminal.

14. The method as claimed in claim 8, wherein said communication services include a push service and the SIP registrar is a push proxy.

15. The method as claimed in claim 1, wherein the unique indication comprises an event name particular to a specific user.

16. The method as claimed in claim 1, wherein the unique indication comprises identification of the particular user.

17. A network architecture, comprising:
a plurality of user terminals;
a radio access network, said radio access network containing elements providing information indicating the presence, status and/or location of said plurality of user terminals;
a presence server, said presence server adapted to receive said information indicating the presence, status and/or location of said plurality of user terminals;
at least one communication service provider providing a plurality of communication services; and
a proxy server, said proxy server adapted to provide said plurality of communication services to said plurality of user terminals upon subscription thereto, wherein the proxy server stores and maintains service information which is related to said plurality of communication services and allows a user to continue their ongoing communication services at a new or recovered user terminal, and which provides said service information in a single message sent in response to a request therefore from a new or recovered user terminal, and wherein when said proxy server receives said request from a new or recovered user terminal, said proxy server resubscribes the user to ongoing subscriptions for which service information is stored therein.

18. The network architecture as claimed in claim 17, wherein said proxy server provides said service information in the payload of a notification message sent to the requesting new or recovered user terminal in response to said request.

19. The network architecture as claimed in claim 18, wherein said presence server, said proxy server and said plurality of user terminals send messages to each other according to the Session Initiation Protocol (SIP) and the notification message comprises a SIP NOTIFY response.

20. The network architecture as claimed in claim 19, wherein said request comprises a SIP SUBSCRIBE message.

21. The network architecture as claimed in claim 18, wherein said new or recovered user terminal comprises a recovered user terminal and said recovered user terminal sends said request after it experiences failure.

22. The network architecture as claimed in claim 18, wherein said new or recovered user terminal comprises a new user terminal and, when a user switches to said new user terminal from a previous user terminal, the new user terminal sends said request to said proxy server.

23. The network architecture as claimed in claim 22, wherein the new user terminal is a different type of user terminal than said previous user terminal.

24. A proxy server, said proxy server being adapted to:
provide a plurality of communication services to a plurality of user terminals upon subscription of said user terminals to said communication services;
store and maintain service information which is related to said plurality of communication services and allows a user to continue their ongoing communication services at a new or recovered user terminal;
provide said service information in a single message sent in response to a request therefore from a new or recovered user terminal; and
when said proxy server receives said request from of said new or recovered user terminal, the proxy server resubscribes the user to ongoing subscriptions for which service information is stored therein.

25. The proxy server as claimed in claim 24, wherein said proxy server provides said service information in the payload of a notification message to the requesting new or recovered user terminal.

26. The proxy server as claimed in claim 25, wherein the proxy server sends and receives messages according to the Session Initiation Protocol (SIP) and the notification message comprises a SIP NOTIFY response.

27. The proxy server as claimed in claim 26, wherein said request comprises a SIP SUBSCRIBE message.

28. A mobile terminal, said mobile terminal being adapted to:
receive a plurality of communication services;
send a subscription message to a registrar, a header in the subscription message containing a unique identification of a particular user;
receive a notification message sent from said registrar in response to said subscription message, the payload of said notification message including service information which allows said particular user to continue to receive a plurality of their communication services at said mobile terminal; and
using said service information included in the payload of said notification message to continue said plurality of communication services at said mobile terminal.

29. The mobile terminal as claimed in claim 28, wherein said subscription message is sent after said mobile terminal experiences a failure.

30. The mobile terminal as claimed in claim 28, wherein said subscription message is sent by said mobile terminal after said user switches to said mobile terminal from a previous mobile terminal.

31. The mobile terminal as claimed in claim 28, wherein said subscription message is a SIP SUBSCRIBE message, said header is an event header in the SIP SUBSCRIBE message and said notification message is a SIP NOTIFY response.

32. The mobile terminal as claimed in claim 28, wherein the unique identification comprises an event name particular to a specific user.

* * * * *